United States Patent [19]

Baker

[11] 4,140,469

[45] Feb. 20, 1979

[54] APPARATUS FOR FORMING CERAMIC BODIES

[75] Inventor: Robert R. Baker, Livonia, Mich.

[73] Assignee: Ford Motor Company, Dearborn, Mich.

[21] Appl. No.: 873,198

[22] Filed: Jan. 30, 1978

[51] Int. Cl.² .............................................. B30B 11/06
[52] U.S. Cl. .................................... 425/515; 425/519; 425/520
[58] Field of Search ................... 425/78, 515, 519, 520

[56] References Cited

U.S. PATENT DOCUMENTS

| | | | |
|---|---|---|---|
| 1,855,855 | 4/1932 | Gillis et al. | 425/78 |
| 2,253,003 | 8/1941 | Whipple | 425/78 X |
| 2,449,008 | 9/1948 | Pecker et al. | 425/78 |
| 2,548,303 | 4/1951 | Gora | 425/515 X |
| 2,549,939 | 4/1951 | Shaw et al. | 425/78 X |
| 3,606,652 | 9/1971 | Hammond | 425/515 |
| 3,720,491 | 3/1973 | Dedek | 425/78 |

*Primary Examiner*—J. Howard Flint, Jr.
*Attorney, Agent, or Firm*—William E. Johnson; Keith L. Zerschling

[57] ABSTRACT

This invention is directed to a specially designed apparatus for bonding a ceramic body to an interior annular surface of a ring shaped body formed of ceramic material. Various specially designed elements are described which permit one to assemble the apparatus and use the same under elevated temperature conditions to bond the ceramic body to the mentioned interior annular surface of the ring shaped body. The apparatus is so designed that all of the elements thereof remain in a centered position during the bonding operation. The apparatus reduces the drag load on the various elements during the bonding operation.

3 Claims, 3 Drawing Figures

APPARATUS FOR FORMING CERAMIC BODIES

STATEMENT

The invention herein described was made in the course of or under a contract or subcontract thereunder, with the Department of Defense.

PRIOR ART STATEMENT AND BACKGROUND OF THE INVENTION

The most pertinent prior art relative to this apparatus that the applicant and his attorney are aware of is that which is to be described hereinbelow.

My associates have been making duo density rotors of silicon nitride for gas turbine engines in the following manner. A rotor blade ring is formed, for example, in an injection molding operation. This blade ring has an annular ring portion with a plurality of complex shaped blade surfaces projecting outwardly therefrom. The blade ring is formed by injection molding silicon particles in a mold suitable for forming the complex shape desired. The particles are suspended in a suitable molding vehicle. After the molding operation, the molding vehicle is burned away as is known in the art to leave behind a consolidated mass of silicon particles in the shape of the blade ring. This blade ring is subsequently subjected to a nitriding operation in which the silicon particles are converted to silicon nitride. All but an interior annular surface of the silicon nitride article is subsequently encapsulated with additional material which is transformed thereafter into silicon nitride to form a ring shaped unit. The article is encapsulated so that the blades and support portion thereof can be supported to withstand the temperatures and pressures of a hot press bonding operation in which a central hub can be simultaneously formed and bonded to an interior annular surface of the blade ring to form a duo density rotor.

The general apparatus previously used for simultaneously forming the central hub and bonding it to an interior annular surface of the blade ring is disclosed in U.S. patent application Ser. No. 571,897 filed Apr. 25, 1975 for METHOD OF FORMING A DUO DENSITY SILICON NITRIDE ARTICLE, which application is now abandoned. This application was assigned to the same assignee as this application and is hereby incorporated by reference. The apparatus disclosed in the mentioned application had several shortcomings and as a result one was unable to obtain finished articles without imperfections. The apparatus disclosed in the cited patent application did not provide sufficient means for assuring an equal distribution of the forces applied to the apparatus during the hot pressing operation.

I have developed modifications of the prior apparatus which allow the manufacture of articles essentially free of cracks. The apparatus of my invention is also efficient in operation.

SUMMARY OF THE INVENTION

This invention relates to an apparatus for bonding a ceramic body to another body and, more particularly, to an apparatus for bonding a ceramic body to an interior annular surface of a ring shaped body formed of a ceramic material.

In accordance with the teachings of this invention, the apparatus for bonding a ceramic body to an interior annular surface of a ring shaped body includes the following elements.

A base of circular cross section is provided. This base has a diameter larger than the diameter of the ring shaped body so that the ring shaped body may be placed on an upper surface thereof.

A plurality of inner wedges are provided. These inner wedges have arcuately shaped inside and outside faces. The plurality of inner wedges are placed on the base in an encircling relationship to an outer annular surface of the ring shaped body. The inside faces of the plurality of inner wedges engage the outer annular surface of the ring shaped body. The outside faces of the plurality of inner wedges are tapered with the narrowest portion thereof being at the upper end thereof.

A single outer ring wedge is also provided. This ring wedge has an inside surface tapered complementary to the tapered surfaces of the plurality of inner wedges. The inside surface of the single outer ring wedge is in contact with the tapered surfaces of the plurality of inner wedges.

A restraining sleeve of ring shape is provided. This restraining sleeve has an outer diameter equal to the diameter of the plurality of inner wedges at the top surface thereof when these wedges are in an assembled condition. The restraining sleeve also has an inner diameter equal to the diameter of the interior annular surface of the ring shaped body. The restraining sleeve, in an assembled condition, has a bottom ring surface in contact with top surfaces of the plurality of inner wedges and the top surface of the ring shaped body.

An outer wedge piston of ring shape has an inner diameter slightly greater than the outside diameter of the restraining sleeve. The outer wedge piston has a lower ring shaped surface for contacting an upper ring shaped surface of the single outer ring wedge. The outer wedge piston also has an upper surface against which a downwardly directed force may be applied to cause the outer wedge piston to apply a downwardly directed force on the upper ring shaped surface of the single outer ring wedge. This action develops a radially inwardly directed force on the ring shaped body by the action of the plurality of inner wedges.

As another element of this structure, there is a die member which has a diameter slightly less than the inside diameter of the restraining sleeve so that the die member is movable therewithin. The die member also has a bottom face which in conjunction with (a) a portion of the upper face of the base, (b) the interior annular surface of the ring shaped body, and (c) a portion of an inside surface of the restraining sleeve defines a volume for receiving a ceramic body therein. The ceramic body may be either a preformed ceramic material or ceramic powder. The die member also has an upper surface against which a downward force may be applied to cause the die member to bond the ceramic body to the interior annular surface of the ring shaped body. In the case where the ceramic body is a ceramic powder, the die member also forms the shape of the part being bonded to the ring shaped body.

An outer holder of ring shape is provided. This outer holder has an inner diameter slightly greater than the outer diameter of the outer wedge piston and the single outer ring wedge. The outer holder encircles the outer wedge piston and the single outer wedge ring as well as the base.

In accordance with the teachings of my invention, a first set of three thin strips of graphite foil are placed between the outer surface of the restraining sleeve and the inner surface of the outer graphite wedge piston.

These three strips of graphite foil are arranged about the circumference of the restraining sleeve in spaced positions approximately 120° of arc from each other.

A second set of three thin strips of graphite foil are also placed between the outer surface of the outer wedge piston and the inner surface of the outer holder. The second set of three thin strips of graphite foil are arranged about the circumference of the outer wedge piston in spaced positions approximately 120° of the arc from each other and 60° of arc from the first set of three thin strips.

The two sets of three thin strips each of graphite foil permit a uniform application of pressure to the equipment to bond the ceramic body to the interior annular surface of the ring shaped body and to resist the pressure developed in the bonding operation. The placement of these two sets of strips reduces the drag loads that are developed in the various elements during the hot press bonding operation.

In accordance with a preferred embodiment of the invention, the various elements of the apparatus are formed from graphite with the exception of the base which is formed from silicon carbide.

DESCRIPTION OF THE PREFERRED EMBODIMENT

An apparatus for bonding a ceramic body to an interior annular surface of a ring shaped body formed of a ceramic material will be described. In this preferred embodiment, the ceramic article manufactured by the apparatus will be a duo density rotor of silicon nitride. The rotor is formed of two elements of different density. The first element of the rotor is an outer blade ring of complex shape.

The first element may be formed by an injection molding technique. In this technique, silicon particles are mixed with a suitable vehicle and injection molded into a mold having the shape desired for the blade ring. After injection molding, the blade ring is removed from the mold and the vehicle burned away thereby leaving behind a consolidated mass of silicon particles. Such a process is known to those skilled in the art.

After the silicon particles are formed into the blade ring desired, the so-formed first element is nitrided in order to produce a body of silicon nitride. Since the first element is formed of silicon particles, the nitriding operation is effective to change the first element into silicon nitride. In the nitriding operation, the element is heated while exposed to nitrogen gas at a temperature and for a sufficient period of time that the silicon is transformed into silicon nitride. A full procedure for nitriding silicon to form silicon nitride is disclosed in U.S. patent application Ser. No. 411,599 filed Oct. 30, 1973 entitled IMPROVED PROCESS FOR MAKING SILICON NITRIDE ARTICLES, now abandoned, which application is assigned to the same assignee as this application and is hereby incorporated by reference. An article of silicon nitride made by an injection molding technique will have a final density in the range of 80 to 85% of theoretical.

Figure 3:
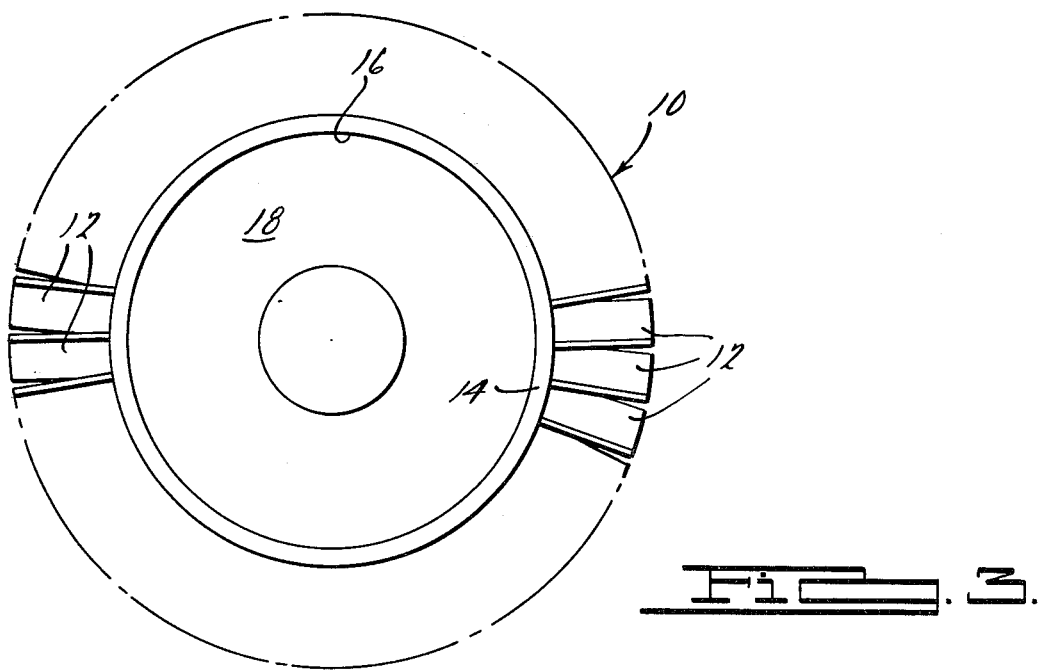
FIG. 3 is an elevation drawing of an article manufactured in the apparatus shown in FIGS. 1 and 2.

Upon completion of the nitriding step, the finished element is a blade ring generally identified by the numeral 10 in the drawings. As best shown in FIG. 3, the blade ring 10 has a plurality of blades 12 thereon attached to a support portion 14. The support portion 14 also defines an inwardly facing bonding surface 16. The blades 12 shown in the drawings are very simple in design for the purpose of illustrating the invention. In an actual turbine structure, these blades have very complex curved surfaces having geometry dictated by the size of the turbine and the amount of gases flowing therethrough.

This invention teaches apparatus for bonding a ceramic body to the inwardly facing bonding surface 16 of the blade ring 10. The ceramic body may be either a preformed body or may be granular refractory ceramic material which can simultaneously be hot press formed and bonded to the surface in question. In accordance with the teachings of this preferred embodiment, the second element is a hub element 18 which is simultaneously formed and bonded to the inwardly facing bonding surface 16 of the blade ring 10 in the apparatus of this invention.

Figure 1:
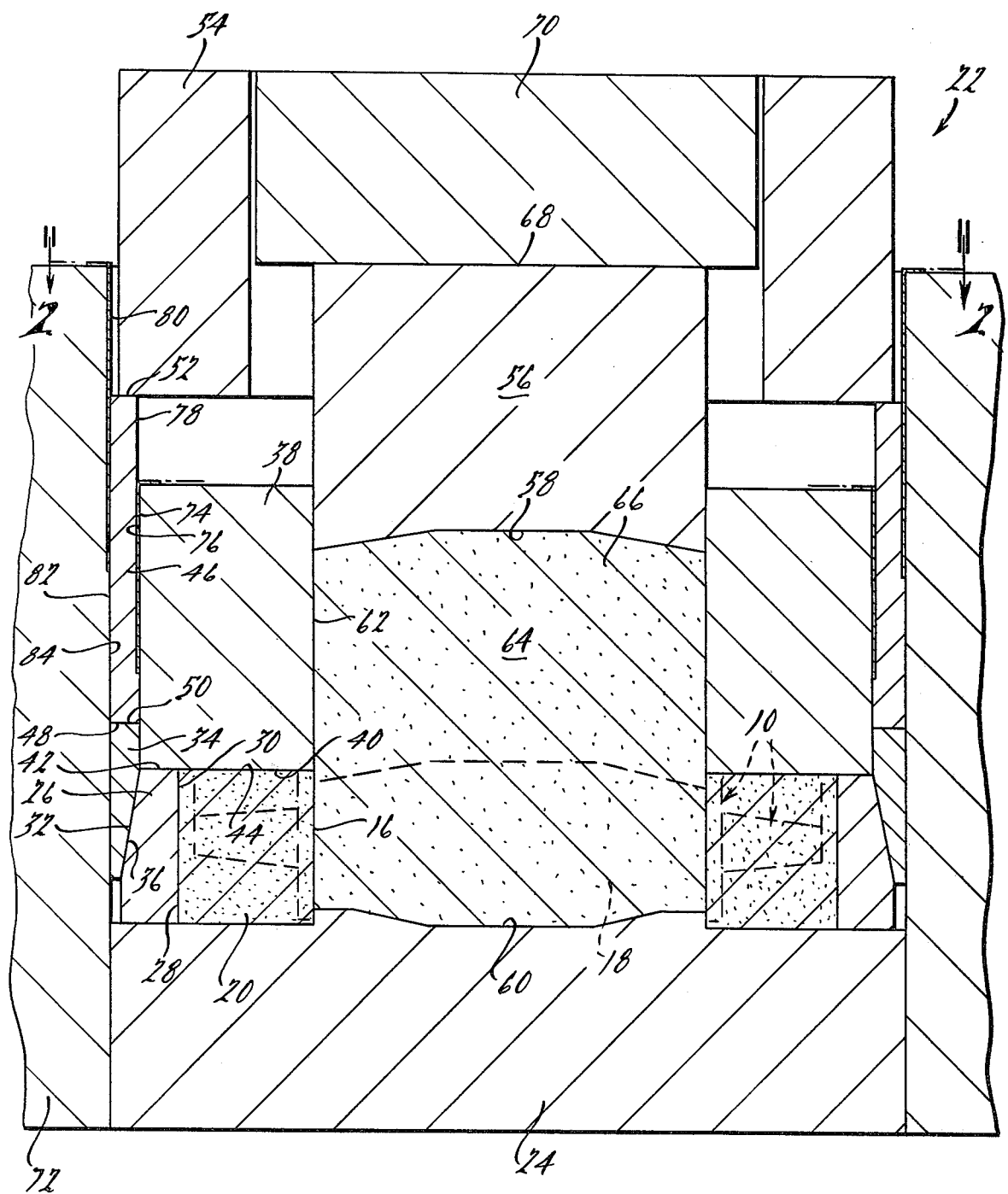
FIG. 1 is a drawing, in cross section, showing, in elevation, the apparatus of my invention.

In order to employ the apparatus in question, it is necessary to encapsulate the blade ring 10 so that the blades and support portion thereof are capable of withstanding the pressures encountered in a hot press forming and bonding operation. The general manner in which an encapsulating operation is carried out so as to provide an encapsulating medium 20, see FIG. 1, is best described in my co-pending application entitled CRACK PROTECTION METHOD, filed Dec. 23, 1977, as Ser. No. 863,990. That application is assigned to the same assignee as this application and is hereby incorporated by reference. Generally, all of the blade ring 10 is encapsulated with the exception of the inwardly facing bonding surface 16 which has no encapsulant placed thereover. After the blade ring has been encapsulated, the entire encapsulated body is now a ring shaped body formed of ceramic material having its inwardly facing bonding surface 16 exposed.

The pressing die structure of my invention is generally identified in FIG. 1 of the drawings by the numeral 22. In accordance with the teachings of this preferred embodiment, the pressing die structure includes a bottom contoured base 24. This base is of circular cross section and, in the preferred embodiment, is formed of silicon carbide. The base has a diameter larger than the diameter of the encapsulated blade ring so that the encapsulated blade ring may be placed on an upper surface of the base.

A plurality of inner wedges 26—26 rest on the base 24. A plurality of these wedges are used so that they may be removed from the base after an article has been manufactured and so that there may be some movement of the individual inner wedges when pressure is applied thereto. Generally, the inner wedges are separated from one another by very small distance such as the amount of 0.090 inches. The plurality of inner wedges 26—26 are placed on the base 24 in an encircling relationship to an outer annular surface 28 of the encapsulated blade ring. Inside faces 30 of the inner wedges 26—26 are arc shaped and engage the outer annular surface 28 of the encapsulated blade ring. Outside faces 32—32 of the inner wedges 26—26 are also arc shaped and are tapered with the narrowest portion of the plurality of inner wedges being at their upper ends. The plurality of inner wedges, in accordance with the preferred teachings, are formed from graphite.

A single outer ring wedge has an inside surface 36 tapered complementary to the outside faces 32—32 of the inner wedges 26—26. The mentioned inside surface of the single outer ring wedge 34 is in contact with the outside faces 32—32 of the plurality of inner wedges 26—26. The single outer ring wedge, in this preferred teaching, is constructed of graphite.

A restraining sleeve 38 of ring shape has an outer diameter equal to the diameter of the plurality of inner wedges 26—26 at their top surface when such wedges are in an assembled condition. The restraining sleeve 38 has an inner diameter equal to the diameter of the inwardly facing bonding surface 16 of the encapsulated blade ring. When in its assembled condition, the restraining sleeve 38 has a bottom ring surface 40 in contact with top surfaces 42 of said plurality of inner wedges 26—26 and a top surface 44 of the encapsulated blade ring. In accordance with the teachings of the preferred embodiment of this invention, this restraining sleeve is also formed from graphite.

An outer wedge piston 46 is of ring shape. This wedge piston has an inner diameter slightly greater than the outside diameter of the restraining sleeve 38. The outer wedge piston has a lower ring shaped surface 48 which contacts an upper ring shaped surface 50 of the single outer ring wedge 34. The outer wedge piston 46 also has an upper ring shaped surface 52 against which a downwardly directed force may be applied by a first piston 54 to apply a downwardly directed force on said upper ring shaped surface 50 of said single outer ring wedge 34 which thereby develops a radially inwardly directed force on the encapsulated blade ring by the action of the plurality of inner wedges 26—26. The outer wedge piston 46 is formed of graphite.

A die member 56 forms part of the structure of this invention. This die member 56 has a diameter slightly less than the inside diameter of the restraining sleeve 38 so that the die member is movable therewithin. The die member 56 has a bottom face 58 which in conjunction with (a) a portion of an upper face 60 of the base 24, (b) the inwardly facing bonding surface 16 of the encapsulated blade ring, and (c) a portion of an inside surface 62 of the restraining sleeve 38 defines a volume 64 for receiving silicon nitride powder 66. The die member 56 also has an upper surface 68 against which a downward force may be applied by a second piston 70 to compact the silicon nitride powder contained in the volume 64 to form a dense compact body 18 and to simultaneously bond the so-formed body 18 to the inwardly facing bonding surface 16 of the encapsulated blade ring.

The silicon nitride powder 66 used in the preferred embodiment of the pressing operation is a mixture consisting of from about 94 to 99.5% by weight of silicon nitride particles, and from about 6.0 to 0.5% by weight of a densification aid. In accordance with the teachings of the preferred embodiment, the silicon nitride powder used in the compacting operation is alpha silicon nitride. In the place of a silicon nitride powder, a pre-formed hub of silicon nitride could be used. If the pre-formed hub is used, the body is only hot press bonded to the surface of the encapsulated blade ring. There is no simultaneous formation of the body in such a case.

An outer holder 72 of ring shape has an inner diameter slightly greater than the outer diameter of the outer wedge piston 46 and the single outer ring wedge 34. The holder 72 encircles the last two mentioned members as well as the base 24. This outer holder is formed of graphite.

Figure 2:
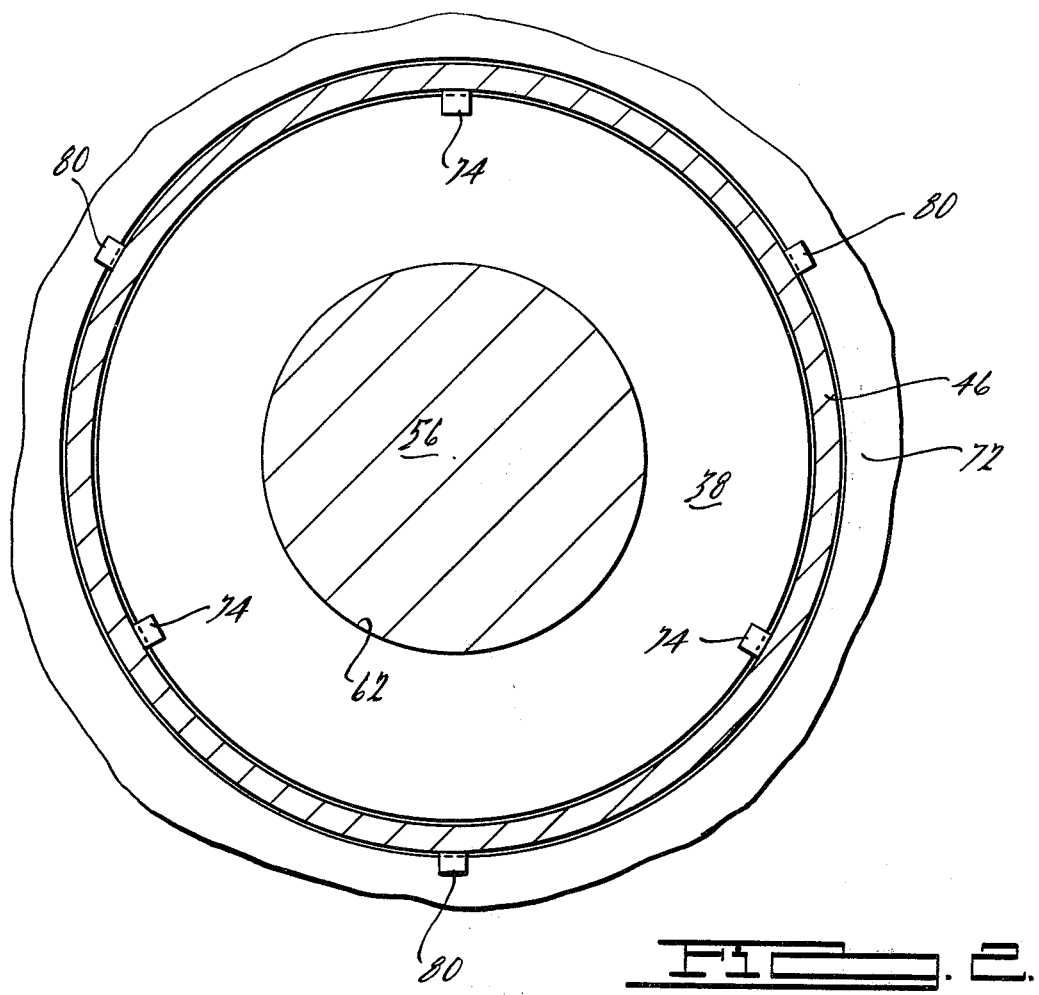
FIG. 2 is a cross-sectional drawing taken along line 2—2 of FIG. 1.

In accordance with the specific details of the apparatus of this invention, a first set of three thin strips of graphite foil 74—74 are placed between an outer surface 76 of the restraining sleeve 38 and an inner surface 78 of the outer graphite wedge piston 46. As best seen in FIG. 2, the three thin strips of graphite foil 74—74 are arranged about the circumference of the restraining sleeve 38 in spaced positions approximately 120° of arc from each other.

A second set of graphite foil strips 80—80 are placed between an outer surface 82 of the outer wedge piston 46 and an inner surface 84 of the outer holder 72. As best seen in FIG. 2, the second set of graphite foil strips 80—80 are arranged about the circumference of the outer wedge piston 46 in spaced positions approximately 120° of arc from each other and 60° of arc from the first set of three thin graphite foil strip 74—74. The graphite foil strips 74—74 and 80—80 extend along the surfaces on which they are placed between from one-quarter to the full length of such surfaces. The so-placed thin strips of graphite foil are effective in making the apparatus of this device operate because of the inherent flexibility of the outer wedge piston 46 to readily deflect due to the discreet load application areas defined by the two sets of graphite foil strips 74—74 and 80—80. An interference condition on one set of graphite foil strips 74—74 or 80—80 causes the outer wedge piston 46 to deform in such a manner that the interference on the other set of graphite foil strips 80—80 or 74—74 is relieved thereby minimizing the drag load between the moving outer wedge piston 46 and the stationary adjoining restraining sleeve 38 and the stationary adjoining outer holder 72. Minimizing the drag load allows one to accurately control the inward load on the outer annular surface 28 of the encapsulated blade ring by varying the applied load on the first piston 54. At the same time, the graphite foil strips 74—74 and 80—80 center the restraining sleeve 38 and the die member 56, with respect to the encapsulated blade ring via the outer holder 72, the single outer ring wedge 34 and the multiple inner wedges 26—26.

The apparatus of this invention is used by initially placing the encapsulated blade ring on the base 24. The plurality of inner wedges 26—26 are then assembled so that the inside faces 30—30 thereof contact the outer annular surface 28 of the encapsulated blade ring. The single outer ring wedge 34 is then placed over the plurality of inner wedges 26—26 so that the inside surface 36 of the single outer ring wedge 34 is in contact with the outside faces 32—32 of the plurality of inner wedges 26—26. The restraining sleeve 38 is then placed on the assembly so that its bottom ring surface 40 is in contact with the top surfaces 42—42 of the plurality of inner wedges 26—26 and the top surface 44 of the blade ring. The first set of strips of graphite foil 74—74 are then placed on the outer surface 76 of the restraining sleeve 38.

The second set of graphite foil strips 80—80 are placed as shown in FIG. 2 on the inner surface 84 of the outer holder 72. The outer wedge piston 46 is then slipped between the outer holder 72 and the restraining sleeve 38.

Silicon nitride powder is then added to the volume 64 and the die member 56 is positioned within the restraining sleeve 38 as shown in FIG. 1.

During the pressing and bonding operation, the second piston 70 acts on the die member 56 to move the same downwardly as viewed in FIG. 1 to compact the silicon nitride powder 66 to form the hub 18. During the pressing and forming, the pressure used to form the hub will cause a radially outwardly directed force to be applied on the inwardly facing bonding surface 16 of the encapsulated blade ring. This force is resisted by application of a pressure from the first piston 54 onto the outer wedge piston 46 which in turn acts on the single ring wedge 34 which in turn acts on the inner wedges 26—26 which apply a radially inwardly directed force to counterbalance the force being applied radially outwardly on the inwardly facing bonding surface 16. All of the apparatus, of course, is used in a furnace environment. The silicon nitride material is hot pressed, formed and bonded at a temperature in the range from about 1650° C. to 1800° C. and at a pressure from about 500psi to about 4000psi. The heating of the material is accomplished by an induction heating unit not shown. Such units are well known in the art. The pressure, of course, is applied by applying compressive forces on the base 24 and the pistons 54 and 70. The pressure applying device is not shown as it is understood by those skilled in the art.

After a pressing operation, the pressing apparatus is turned off and allowed to cool slowly back to room temperature. The press bonded rotor assembly is allowed to cool simply by leaving it in the press. When the assembly is cool, the removable elements are removed to take the now almost finished turbine rotor therefrom. In a finishing operation, the encapsulant is removed from the blade ring which now has a hub hot press bonded thereto.

There has been disclosed herein an apparatus for bonding a ceramic body to an interior annular surface of a ring shaped body formed of a ceramic material. It is intended that all modifications which fall within the spirit and scope of this invention be included within the appended claims.

I claim:

1. An apparatus for bonding a ceramic body to an interior annular surface of a ring shaped body formed of a ceramic material, which apparatus comprises:

a base of circular cross section, said base having a diameter larger than the diameter of the ring shaped body so that the ring shaped body may be placed on an upper surface of said base;

a plurality of inner wedges having arcuately shaped inside and outside faces, said plurality of inner wedges being placed on said base in an encircling relationship to an outer annular surface of the ring shaped body with said inside faces of said plurality of inner wedges engaging said outer annular surface of the ring shaped body, said outside faces of said plurality of inner wedges being tapered with the narrowest portion of said plurality of inner wedges being at an upper end thereof;

a single outer ring wedge having an inside surface tapered complementary to said tapered surface of said plurality of inner wedges, said inside surface of said single outer ring wedge being in contact with said tapered surfaces of said plurality of inner wedges;

a restraining sleeve of ring shape, said restraining sleeve having an outer diameter equal to the diameter of said plurality of inner wedges at the top surface thereof when in an assembled condition and an inner diameter equal to the diameter of the interior annular surface of the ring shaped body, said restraining sleeve, in an assembled condition, having a bottom ring surface in contact with top surfaces of said plurality of inner wedges and the top surface of the ring shaped body;

an outer wedge piston of ring shape having an inner diameter slightly greater than the outside diameter of said restraining sleeve, said outer wedge piston having a lower ring shaped surface for contacting an upper ring shaped surface of said single outer ring wedge, said outer wedge piston also having an upper surface against which a downwardly directed force may be applied to cause said outer wedge piston to apply a downwardly directed force on said upper ring shaped surface of said single outer ring wedge thereby developing a radially inwardly directed force on the ring shaped body by the action of said plurality of inner wedges;

a die member having a diameter slightly less than the inside diameter of said restraining sleeve so that said die member is movable therewithin, said die member also having a bottom face which in conjunction with (a) a portion of said upper face of said base, (b) said interior annular surface of the ring shaped body, and (c) a portion of an inside surface of said restraining sleeve defines a volume for receiving a ceramic body, said die member also having an upper surface against which a downward force may be applied to cause said die member to bond the ceramic body to the interior annular surface of the ring shaped body;

an outer holder of ring shape having an inner diameter slightly greater than the outer diameter of said outer wedge piston and said single outer ring wedge and encircling said last two members and said base;

a first set of three thin strips of graphite foil placed between said outer surface of said restraining sleeve and said inner surface of said outer graphite wedge piston and being arranged about the circumference thereof in spaced positions approximately 120° of arc from each other; and a second set of three thin strips of graphite foil placed between said outer surface of said outer wedge piston and said inner surface of said outer holder and being arranged about the circumference thereof in spaced positions approximately 120° of arc from each other and 60° of the arc from said first set of three thin strips.

2. The apparatus of claim 1 wherein:

said inner wedges, said outer ring wedge, said restraining sleeve, said outer wedge piston, said die member, and said outer holder are formed of graphite.

3. An apparatus for forming a silicon nitride powder into a dense compact body and for simultaneously bonding the so-formed compact body to an interior annular surface of a ring shaped body formed of silicon nitride, which apparatus comprises:

a base of circular cross section formed of silicon carbide, said base having a diameter larger than the diameter of the ring shaped body so that the ring shaped body may be placed on an upper surface of said base;

a plurality of inner wedges formed of graphite having arcuately shaped inside and outside faces, said plurality of inner wedges being placed on said base in an encircling relationship to an outer annular surface of the ring shaped body with said inside faces of said plurality of inner wedges engaging said outer annular surface of the ring shaped body, said outside faces of said plurality of inner wedges being tapered with the narrowest portion of said plurality of inner wedges being at an upper end thereof;

a single outer ring wedge formed of graphite having an inside surface tapered complementary to said tapered surfaces of said plurality of inner wedges, said inside surface of said single outer ring wedge being in contact with said tapered surfaces of said plurality of inner wedges;

a restraining sleeve of ring shape formed of graphite said restraining sleeve having an outer diameter equal to the diameter of said plurality of inner wedges at the top surface thereof when in an assembled condition and an inner diameter equal to the diameter of the interior annular surface of the ring shaped body, said restraining sleeve, in an assembled condition, having a bottom ring surface in contact with top surfaces of said plurality of inner wedges and the top surface of the ring shaped body;

an outer wedge piston of ring shape formed of graphite having an inner diameter slightly greater than the outside diameter of said restraining sleeve, said outer wedge piston having a lower ring shaped surface for contacting an upper ring shaped surface of said single outer ring wedge, said outer wedge piston also having an upper surface against which a downwardly directed force may be applied to cause said outer wedge piston to apply a downwardly directed force on said upper ring shaped surface of said single outer ring wedge thereby developing a radially inwardly directed force on the ring shaped body by the action of said plurality of inner wedges;

a die member formed of graphite having a diameter slightly less than the inside diameter of said restraining sleeve so that said die member is movable therewithin, said die member also having a bottom face which in conjunction with (a) a portion of said upper face of said base, (b) said interior annular surface of the ring shaped body, and (c) a portion of an inside surface of said restraining sleeve defines a volume for receiving silicon nitride powder, said die member also having an upper surface against which a downward force may be applied to cause said die member to compact the silicon nitride powder contained in said volume to form a dense compact body and to bond the so-formed body to the interior annular surface of the ring shaped body;

an outer holder, of ring shape formed of graphite having an inner diameter slightly greater than the outer diameter slightly greater than the outer diameter of said outer wedge piston and said single outer ring wedge and encircling said last two members and said base;

a first set of three thin strips of graphite foil placed between said outer surface of said restraining sleeve and said inner surface of said outer graphite wedge piston and being arranged about the circumference thereof in spaced positions approximately 120° of arc from each other; and a second set of three thin strips of graphite foil placed between said outer surface of said outer wedge piston and said inner surface of said outer holder and being arranged about the circumference thereof in spaced positions approximately 120° of arc from each other and 60° of arc from said first set of three thin strips.

* * * * *